J. W. OLTMANN.
WEEDING AND CULTIVATING TOOL.
APPLICATION FILED OCT. 11, 1910.

1,035,226.

Patented Aug. 13, 1912.

Witnesses
H. A. Stock.
H. C. Schwede.

Inventor
John W. Oltmann

By E. E. Vrooman,
his Attorney

UNITED STATES PATENT OFFICE.

JOHN WILLIAM OLTMANN, OF OAKLAND, CALIFORNIA.

WEEDING AND CULTIVATING TOOL.

1,035,226.  Specification of Letters Patent.  Patented Aug. 13, 1912.

Application filed October 11, 1910. Serial No. 586,522.

*To all whom it may concern:*

Be it known that I, JOHN W. OLTMANN, a citizen of the United States, residing at Oakland, in the county of Alameda and State of California, have invented certain new and useful Improvements in Weeding and Cultivating Tools, of which the following is a specification.

This invention relates to gardening tools and the principal object of the same is to provide a tool of the type specified that can be used for cutting, chopping, digging and transplanting.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1:
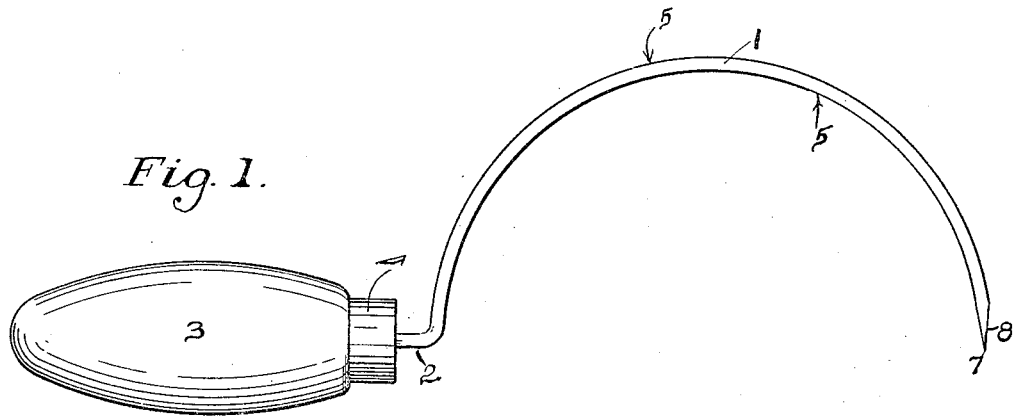
Figure 2:
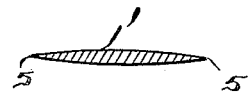
Figure 3:
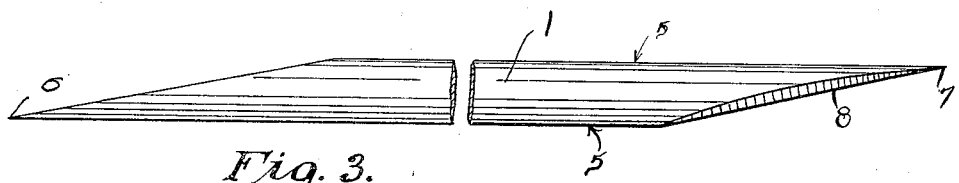

Figure 1 is a detail view in side elevation of the improved gardening tool. Fig. 2 is a transverse sectional view showing the shape of the blade of the tool in cross-section. Fig. 3 is a detail view of the blade blank before being bent into operative form.

Referring to the accompanying drawings by numerals, it will be seen that the improved gardening tool comprises a semi-circular blade 1 provided with a shank 2 at one end which is fastened within a handle 3 by a ferrule 4. Said blade and shank are formed from a single length of material and are rolled to the transversely tapering cross-sectional shape shown in Fig. 2 which provides the blade with cutting edges 5 on both longitudinal edges.

The blanks from which the blades and shanks are made are produced in long lengths which have been rolled to the shape shown in Fig. 2, and said long lengths of material are sheared off into a plurality of strips of the length of the finished article. One end is beveled to provide the elongated penetrating pointed end 6 which is the free end of the shank and which obviously can be readily forced into the handle 3. The other end 7 is also beveled to provide an elongated digging point, and the longitudinal outer edge of said elongated pointed end is transversely beveled to provide a cutting edge 8.

The improved tool being comparatively flat and broad can be used for supporting plants while being transplanted, the inner sharpened longitudinal edge can be used for cutting weeds, grass and the like in the same manner as the well known grass sickle; the outer longitudinal sharpened edge can be used for chopping stalks and the like, and the pointed free end of the blade can be used for digging and both edges thereof being sharpened, said edges can be used for cutting roots and the like.

Tools constructed in accordance with this invention are formed from long strips of metal that are shaped to provide the longitudinal cutting edges 5. A suitable stamping or punching machine is used to produce the blanks for the tools so that in one operation said blanks are produced having the beveled or sheared ends 6 and 7. The blanks are then semi-circularly shaped with the end 6 projecting at right angles to provide a handle engaging shank, and the other end sharpened, as indicated at 8, to provide said end 7 with a cutting edge.

What I claim as my invention is:—

As a new article of manufacture, a sickle blade comprising a curved strip of metal sharpened upon its outer and inner edges, one end of said strip being bent to form a shank adapted to be connected to a handle, said strip having its ends cut at an angle parallel to each other for allowing the blades to be cut from a continuous strip of metal without producing any waste, one of said ends forming a point for engaging said handle, the other of said ends being sharpened to form a beveled cutting point whereby the blade may be efficiently used for cutting grass and undergrowth in corners or sharp turns.

In testimony whereof I affix my signature in presence of two witnesses.

JOHN WILLIAM OLTMANN.

Witnesses:
H. C. SCHROEDER,
F. P. SCHROEDER.

Copies of this patent may be obtained for five cents each, by addressing the "Commissioner of Patents, Washington, D. C."